(12) United States Patent
Combs et al.

(10) Patent No.: US 6,434,136 B1
(45) Date of Patent: Aug. 13, 2002

(54) SINGLE CHANNEL AUTONOMOUS TRUNKING (SCAT) SYSTEMS AND METHODS THAT USE A SINGLE DUPLEX TIME DIVISION MULTIPLE ACCESS (TDMA) CHANNEL FOR SCAT CONTROL AND WORKING CHANNELS

(75) Inventors: Edward Alexander Combs, Forest; William Oscar Janky, Goode; Andrew Sam Mack, Lynchburg, all of VA (US)

(73) Assignee: M/A-Com Private Radio Systems, Inc., Lynchburg, VA (US)

( * ) Notice: Subject to any disclaimer, the term of this patent is extended or adjusted under 35 U.S.C. 154(b) by 0 days.

(21) Appl. No.: 09/175,697

(22) Filed: Oct. 20, 1998

(51) Int. Cl.[7] ................................................. H04B 7/14
(52) U.S. Cl. ...................................... 370/347; 370/442
(58) Field of Search ................................ 370/327, 321, 370/337, 347, 442; 342/357.02

(56) References Cited

U.S. PATENT DOCUMENTS 5,408,680 A   4/1995   Hattey et al. .................. 455/15
5,852,412 A * 12/1998  Stangeland ............ 342/357.02

OTHER PUBLICATIONS

Ericsson, "Configuration Manual, EDACS® Single Channel Autonomous Trunking (SCAT) GETC, LBI, 38987B", May 1994, pp. 1–32.

* cited by examiner

Primary Examiner—Salvatore Cangialosi
(74) Attorney, Agent, or Firm—James H. Beusse, Esq.; Beusse, Brownlee, Bowdoin & Wolter, P.A.

(57) ABSTRACT

Single Channel Autonomous Trunking (SCAT) radio frequency systems and methods use a single duplex Time Division Multiple Access (TDMA) channel for the control and working channels thereof. By providing a single duplex TDMA radio frequency channel including a plurality of TDMA time slots in SCAT systems and methods, the SCAT systems and methods can simultaneously operate in a control channel mode and a working channel mode using the single duplex TDMA radio frequency channel.

18 Claims, 4 Drawing Sheets

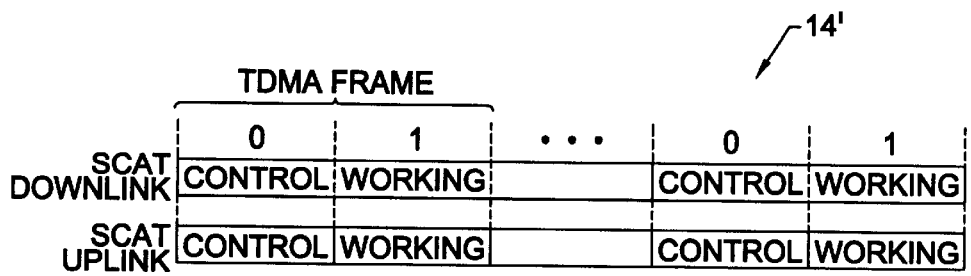
FIG. 2.
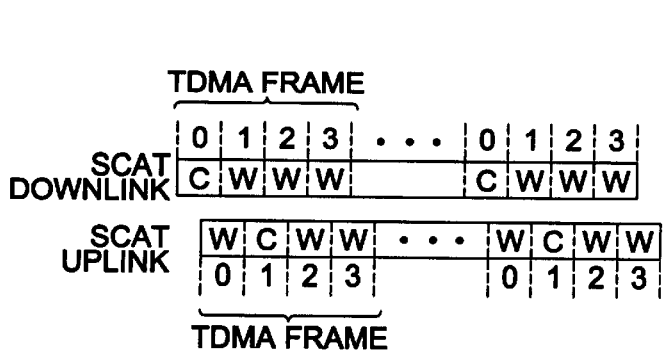
FIG. 3.
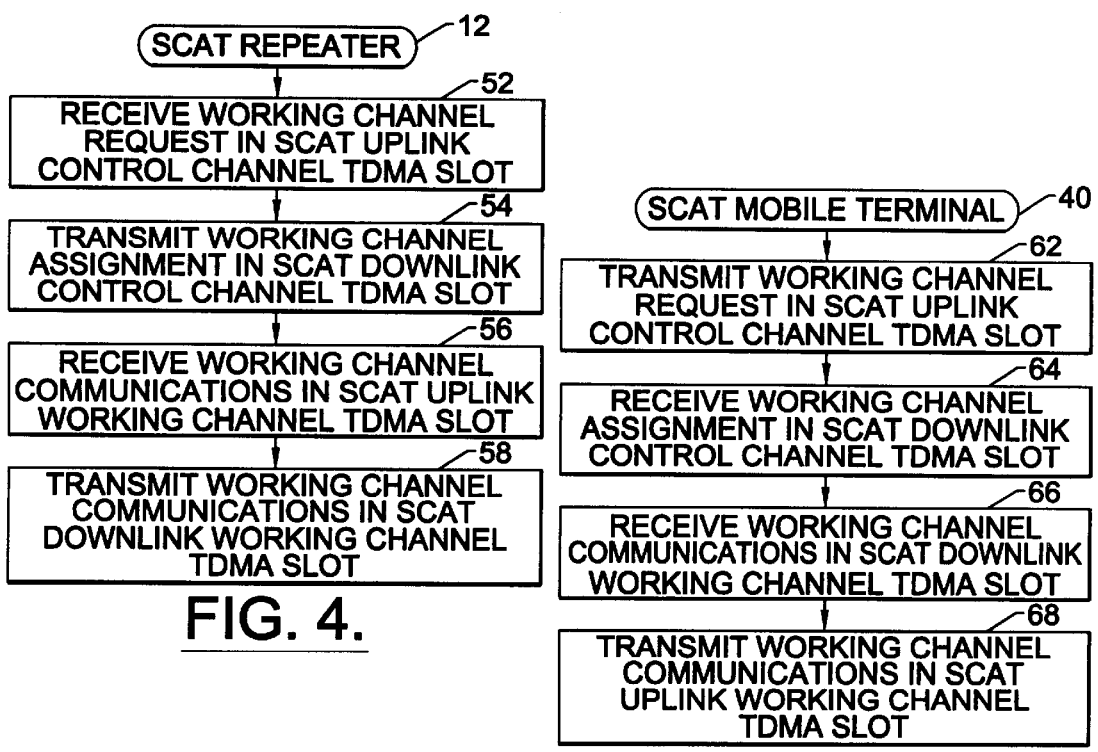
FIG. 4.
FIG. 5.

SINGLE CHANNEL AUTONOMOUS TRUNKING (SCAT) SYSTEMS AND METHODS THAT USE A SINGLE DUPLEX TIME DIVISION MULTIPLE ACCESS (TDMA) CHANNEL FOR SCAT CONTROL AND WORKING CHANNELS

FIELD OF THE INVENTION

This invention relates to trunked radio frequency communications systems and methods, and more particularly to Single Channel Autonomous Trunking (SCAT) radio frequency communications systems and methods.

BACKGROUND OF THE INVENTION

Trunked radio systems and methods are widely used by public safety organizations, transport companies, and other organizations for dispatch and other two-way communications within the organization. Trunked systems and methods may be used when high reliability and short access times are desired for short messages. In a trunked system, a plurality of duplex radio frequency communications channels and associated repeaters are shared among multiple mobile terminals. Each mobile terminal is able to transmit a communication such as a short message on any of the radio frequency channels. A mechanism is provided for temporarily allocating channels to calling and called mobiles on a demand basis. At the conclusion of the communication, the channel in use becomes de-assigned so that it is available for reassignment to other mobile terminals. Both analog and digital trunked radio communications systems and methods are presently employed. The design and operation of trunked radio frequency communications systems and methods are well known to those having skill in the art and need not be described further herein.

A particular trunked radio system and method, referred to as a Single Channel Autonomous Trunking (SCAT) communications system and method, provides control channel and working channel (also referred to as "assigned channel") signaling over a single radio frequency channel. The single radio frequency channel operates alternately in a control channel mode and in a working channel mode, with the idle mode being the control channel mode. When the SCAT system is idle, control channel signaling is transmitted over the single channel. When a channel request is received, a channel assignment message is sent out in a standard manner via the control channel signaling and the single channel then begins operating as a working channel. At the conclusion of the working channel communication, the single channel reverts to the control channel mode in readiness for further channel assignments.

SCAT can thus offer an enhanced trunking solution that can provide trunked radio coverage in difficult coverage areas with low traffic. SCAT can permit public safety customers who are already part of a large network to extend their communications coverage over difficult areas, such as tunnels, large buildings and shopping centers, in a cost effective, frequency-efficient manner. SCAT can also be viewed as an enhanced single channel system that can provide all of the functionality of a conventional system, plus advanced digital trunking features, such as emergency, multi-group privacy and individual call capabilities. SCAT systems and methods are described in U.S. Pat. No. 5,408,680 to Hattey et al., entitled "Single Channel Autonomous Digitally Trunked RF Communications System", the disclosure of which is hereby incorporated herein by reference. A SCAT system that is marketed by the assignee of the present invention is described in a publication entitled "*Configuration Manual, EDACS® Single Channel Autonomous Trunking (SCAT) GETC, LBI-38987B*", May 1994, pages 1–32, the disclosure of which is hereby incorporated herein by reference.

SUMMARY OF THE INVENTION

The present invention provides Single Channel Autonomous Trunking (SCAT) radio frequency systems and methods that use a single duplex Time Division Multiple Access (TDMA) channel for the control and working channels thereof. As is well known to those having skill in the art, in TDMA, a radio frequency channel is divided into sequential time slots. Communications occur using bursts of digital data transmitted during an assigned time slot. By providing a single duplex TDMA radio frequency channel including a plurality of TDMA time slots in SCAT systems and methods, the SCAT systems and methods can simultaneously operate in a control channel mode and a working channel mode using the single duplex TDMA radio frequency channel.

More specifically, SCAT systems and methods according to the invention include at least one SCAT repeater and at least one SCAT mobile terminal. Each SCAT repeater comprises a single duplex TDMA radio frequency channel including a plurality of TDMA time slots. At least a first one of the TDMA time slots is a SCAT control channel that receives working channel requests and that transmits working channel assignments. At least a second one of the TDMA time slots is a SCAT working channel that transmits and receives working channel communications in accordance with the working channel assignments.

SCAT mobile terminals according to the invention also comprise the single duplex TDMA radio frequency channel including the plurality of TDMA time slots. At least the first one of the TDMA time slots is the SCAT control channel that transmits working channel requests and that receives working channel assignments. At least the second one of the TDMA time slots is the SCAT working channel that transmits and receives working channel communications in accordance with the working channel assignments.

A SCAT repeater may also be regarded as including means for transceiving a single duplex TDMA radio frequency channel including a plurality of TDMA time slots. Means are also included for receiving SCAT working channel requests and for transmitting SCAT working channel assignments in at least a first one of the plurality of TDMA time slots. Means are also included for transmitting and receiving SCAT working channel communications in accordance with the working channel assignments in at least a second one of the plurality of TDMA time slots. SCAT repeater methods also may be provided.

A SCAT mobile terminal may also be regarded as including means for transceiving a single duplex TDMA radio frequency channel including a plurality of TDMA time slots. Means are also included for transmitting SCAT working channel requests and for receiving SCAT working channel assignments in at least the first one of the plurality of TDMA time slots. Means are also included for transmitting and receiving SCAT working channel communications in accordance with the working channel assignments in at least the second one of the TDMA time slots. SCAT mobile terminal methods also may be provided.

In one embodiment of the present invention, the TDMA radio frequency channel includes a frame having first and second TDMA time slots. One of the TDMA time slots is the SCAT control channel and the other of the TDMA time slots is the SCAT working channel. However, more than two TDMA time slots may be provided so that one or more TDMA time slots operates as a SCAT control channel and one or more TDMA time slots operate as a SCAT working channel.

Accordingly, SCAT repeaters and mobiles need not operate alternately in a control channel mode and in a working channel mode. Rather, SCAT repeaters and mobiles may simultaneously operate in a control channel mode and in a working channel mode using a single duplex radio frequency channel that is divided into a plurality of TDMA time slots. More efficient SCAT systems and methods may thereby be provided, that can allow more reliable communications and more rapid access to a working channel.

According to another embodiment of the invention, the at least a first one of the plurality of TDMA time slots is alternatingly a SCAT working channel that transmits and receives working channel communications in accordance with the working channel assignments. Thus, the at least a first one of the plurality of TDMA time slots may be alternatingly used as a SCAT control channel and a SCAT working channel, as was described in the Hattey et al. patent. SCAT repeaters and mobiles may simultaneously operate in a control channel mode and in a working channel mode and may also alternatingly operate in a control channel mode and a working channel mode. Thus, added channel capacity may be provided when desired.

BRIEF DESCRIPTION OF THE DRAWINGS

FIGS. 2 and 3 illustrate TDMA channels that can be used for SCAT working and control channels according to the present invention.

FIG. 4 is a flowchart illustrating operations performed by SCAT repeaters according to the present invention.

FIG. 5 is a flowchart illustrating operations performed by SCAT mobile terminals according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
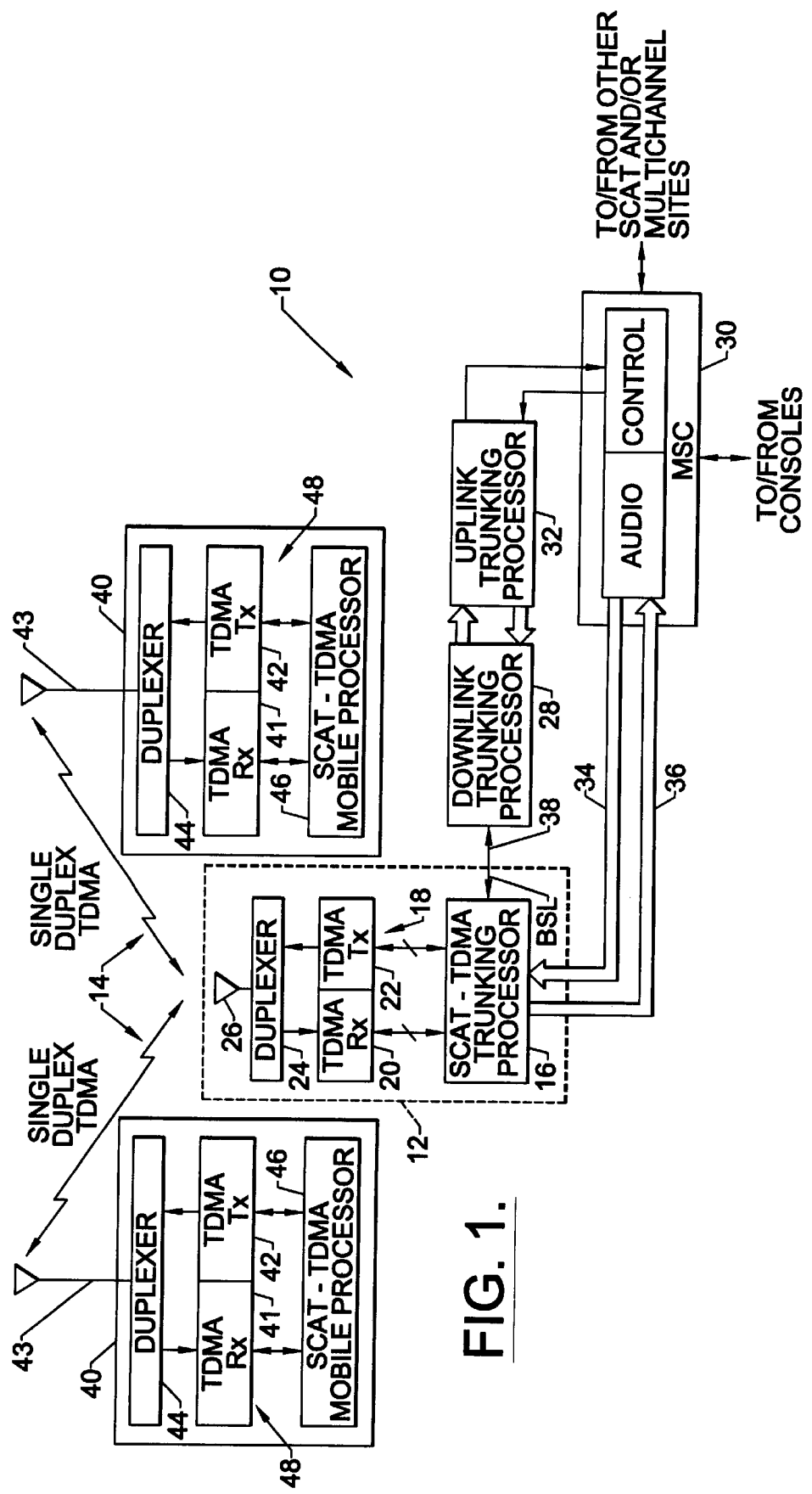
FIG. 1 is a schematic block diagram of SCAT systems and methods according to the present invention.

FIG. 1 is a schematic block diagram of SCAT systems and methods according to the present invention that use time slots in a single duplex TDMA channel for the control and working channels thereof. As shown in FIG. 1, SCAT system 10 includes a SCAT repeater 12 (also referred to as "site equipment") and a plurality, typically many, SCAT mobile terminals 40. The SCAT mobile terminals 40 communicate with one another and with dispatchers via the repeater 12 over a single duplex TDMA radio frequency channel 14 including a plurality of TDMA time slots. It will also be understood that multiple repeaters 12 may be provided.

The repeater 12 includes a SCAT-TDMA trunking processor 16 and a full duplex radio frequency TDMA transceiver 18 including a TDMA receiver 20 and a TDMA transmitter 22. A duplexer 24 and a radio frequency antenna 26 are also included. The TDMA receiver 20 and the TDMA transmitter 22 provide a single, full duplex TDMA radio frequency channel including a TDMA frame having a plurality of TDMA time slots.

SCAT-TDMA trunking processor 16 may include a digital microprocessor that performs controlling signal processing functions associated with the operation of the repeater 12. The SCAT-TDMA trunking processor 16 may be provided with appropriate hardware and/or software that enable it to perform SCAT operations.

SCAT systems and methods according to the present invention can work either as a single site system or as part of a standard multi-site network environment, such as the EDACS® Trunking System that is marketed by the assignee of the present invention. In a multi-site network environment, a downlink trunking processor 28 may also be included that communicates digital control information bidirectionally with a console and/or a Multi-Site Controller (MSC) 30 via an uplink trunking processor 32. The downlink trunking processor 28 and the uplink trunking processor 32 may use standard EDACS® signaling protocols. The multi-site controller 30 and/or a console may communicate audio signals to and from the SCAT trunking processor 16 via audio links 34 and 36. The multi-site controller 30 provides interconnectivity between the repeater 12 and the repeaters of other single channel and/or multi-channel sites; and/or may provide connectivity with one or more dispatcher consoles. In another configuration, where interaction with other trunk sites is not required but interaction with one or more dispatch consoles may be desired, the multi-site controller 30 may be replaced with a dispatch console interface and associated consoles, as is well known to those having skill in the art. The design and operation of the downlink trunking processor 28, the uplink trunking processor 32 and the multi-site controller 30 are well known to those having skill in the art and need not be described further herein.

Still referring to FIG. 1, each SCAT mobile terminal 40 includes an antenna 43 and a duplexer 44. A TDMA receiver 41 and a TDMA transmitter 42 provide a SCAT-TDMA transceiver 48. A SCAT-TDMA mobile processor 46 interacts with the SCAT-TDMA transceiver, as will be described below. The SCAT-TDMA mobile processor 46 may also interact with a microphone, loudspeaker, keys, switches, displays and/or other components of a user interface, in a manner well known to those having skill in the art.

Referring now to FIG. 2, a single duplex TDMA radio frequency channel 14' that may be used for communication between one or more SCAT radio frequency repeaters 12 and one or more SCAT mobile terminals 40 will now be described. As shown in FIG. 2, the single TDMA radio frequency channel 14' includes a series of TDMA frames each having a plurality of TDMA time slots. In FIG. 2, two TDMA time slots are shown, labeled "0" and "1". The SCAT repeater 12 communicates with the SCAT mobiles 40 using a SCAT Downlink portion of the single duplex TDMA radio frequency channel 14'. The SCAT mobile terminals 40 communicate with the SCAT repeaters 12 using a SCAT Uplink portion of the single duplex TDMA radio frequency channel 14'.

In FIG. 2, each TDMA frame has only two time slots and the time slots in the SCAT downlink and SCAT uplink portions of the single duplex TDMA radio frequency channel align with one another in time. In contrast, FIG. 3 describes another embodiment of a single duplex TDMA RF channel 14" in which the TDMA frame includes four TDMA time slots labeled "0", "1", "2" and "3". In the SCAT Downlink portion, the control channel ("c") is slot 0, and slots 1, 2 and 3 are working channels ("w"). In the SCAT Uplink portion, the control channel is slot 1, and slots 0, 2 and 3 are working channels. Moreover, the TDMA frames in the SCAT downlink and uplink portions are not aligned in time. Many other embodiments of a single duplex TDMA radio frequency channel may be used in SCAT systems and methods according to the present invention.

According to another embodiment of the present invention, the control channel slot(s) can also be assigned to a working channel mode in a manner similar to the above-cited U.S. Pat. No. 5,408,680 to Hattey et al. Thus, additional working channel conversations may be obtained on a single channel when the working channel demands so dictate. Accordingly, any of the TDMA time slots can be alternatingly used as a SCAT working channel and as a SCAT control channel. Sub-Audible Control Channel (SACCH) information may be used in the downlink working channel frames to inform a SCAT mobile terminal of the current site activity when all of the slots are assigned to SCAT working channels. Moreover, for data communications rather than voice communications, multiple slots can be assigned to a working channel in order to increase throughput.

FIGS. 4 and 5 are flow charts illustrating operations performed by a SCAT repeater 12 and a SCAT mobile terminal 40 respectively, according to the present invention.

As will also be appreciated by one of skill in the art, the present invention may be embodied as methods, systems (apparatus), or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer readable program code means embodied in the medium. Any suitable computer readable medium may be utilized including hard disks, CD-ROMs, optical storage devices, or magnetic storage devices.

Operations for various aspects of one embodiment of the present invention are illustrated in detail in FIGS. 4 and 5 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps such as was described in FIGS. 4 and 5, or by combinations of special purpose hardware and computer instructions.

Referring now to FIG. 4, operations performed by a SCAT repeater 12 according to the present invention will now be described. As shown at Block 52, working channel requests are received in the SCAT Uplink control channel TDMA slot, for example, slot 0 in FIG. 2 and slot 1 in FIG. 3. At Block 54, working channel assignments are transmitted in the SCAT Downlink control channel TDMA slot, for example slot 0 in FIG. 2 and slot 0 in FIG. 3. At Block 56, working channel communications are received in the SCAT Uplink working channel TDMA slot, for example slot 1 in FIG. 2 or slots 0, 2 or 3 in FIG. 3. Finally, at Block 58, working channel communications are transmitted in a SCAT Downlink working channel TDMA slot, for example slot 1 in FIG. 2 and slots 1, 2 or 3 in FIG. 3. Accordingly, the SCAT repeater can simultaneously operate in a control channel mode and a working channel mode using a single duplex radio frequency channel. There is no need to alternately switch between control and working channel operations. Alternatively, if desired, at different times the SCAT repeater can alternately switch between control and working channel operations in one TDMA time slot while preserving at least one other TDMA time slot for working channel communications.

Referring now to FIG. 5, operations performed by a SCAT mobile terminal 40 of FIG. 1 will now be described. At Block 62, a working channel request is transmitted in a SCAT Uplink control channel TDMA slot, for example slot 0 of FIG. 2 and slot 1 of FIG. 3. At Block 64, a working channel assignment is received in a SCAT Downlink control channel TDMA slot, for example slot 0 of FIG. 2 and slot 0 of FIG. 3. At Block 66, a working channel communication is received in a SCAT Downlink working channel TDMA slot, for example slot 1 of FIG. 2 or slots 1, 2 or 3 of FIG. 3. Finally, at Block 68, a working channel communication is transmitted in a SCAT Uplink working channel TDMA slot, for example slot 1 of FIG. 2 and slots 0, 2 or 3 of FIG. 3. It will be understood that the operations of Blocks 66 and 68 generally do not take place in the same SCAT mobile terminal simultaneously. Accordingly, a SCAT mobile terminal can simultaneously operate in a control channel mode and a working channel mode using a single duplex radio frequency channel. Switching between alternating control channel modes and working channel need not be performed. Alternatively, if desired, at different times the SCAT repeater can alternately switch between control and working channel operations in one TDMA time slot while preserving at least one other TDMA time slot for working channel communications.

Figure 6:
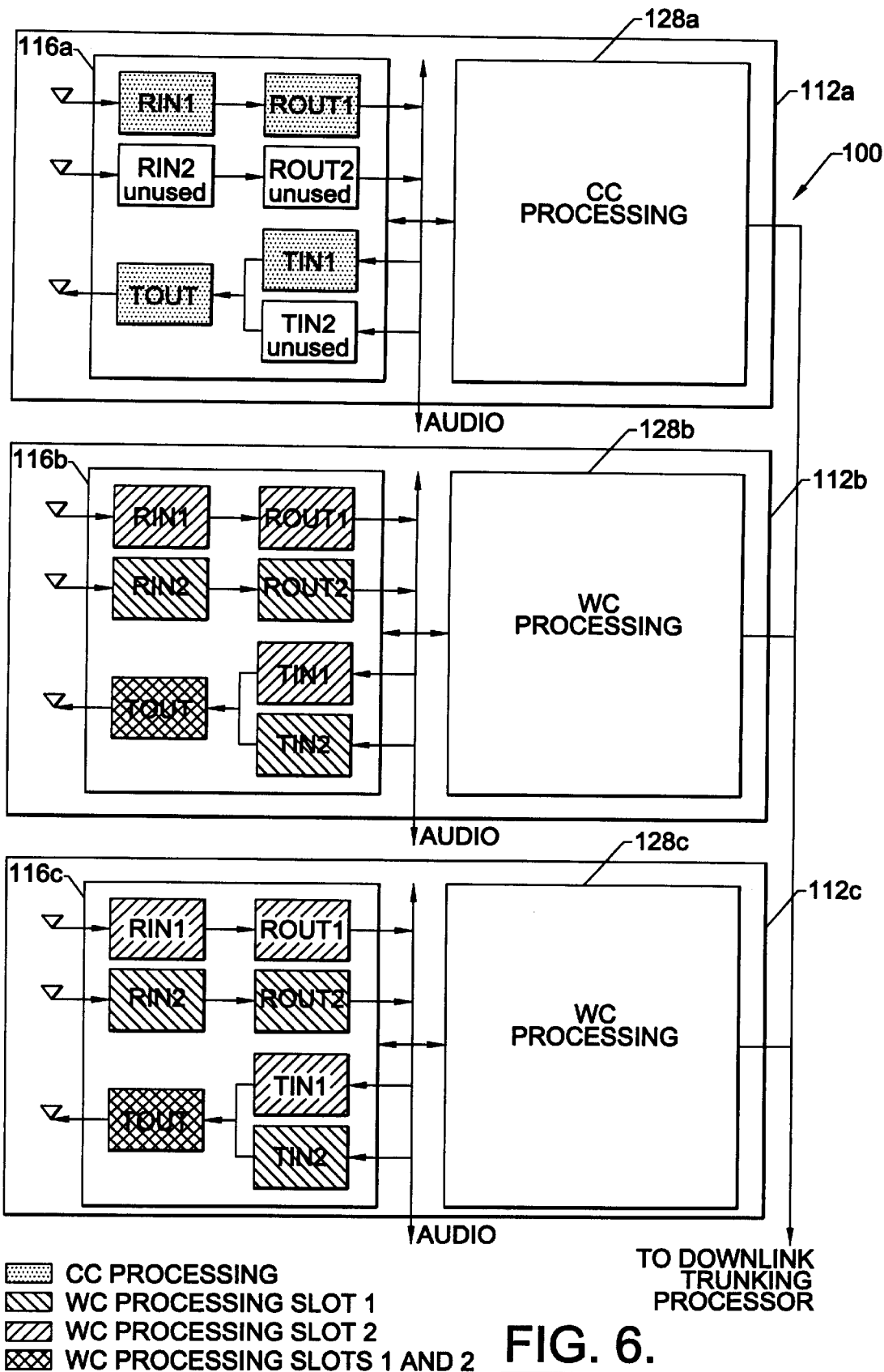
FIG. 6 illustrates a first embodiment of a trunked radio system that provides SCAT systems and methods according to the present invention.

Referring now to FIG. 6, a first embodiment of a conventional EDACS® trunked radio system that is modified to provide a SCAT system according to the present invention will now be described. As shown in FIG. 6, an EDACS® station 100 includes three repeaters 112a, 112b and 112c. Each repeater includes a SCAT trunking processor 116a, 116b, 116c. Each EDACS® repeater also includes a working channel processor. The working channel processors are coupled to a downlink trunking processor or multi-site controller via an inter-station local area network (LAN).

Still referring to FIG. 6, each of the SCAT trunking processors 116 may be implemented using an array of seven digital signal processors, referred to as RIN1, RIN2, ROUT1, ROUT2, TIN1, TIN2 and TOUT. Digital signal processors RIN1 and RIN2 perform inbound receive signal processing, and digital signal processors ROUT1 and ROUT2 perform outbound receive signal processing. Digital processors TIN1 and TIN2 perform inbound transmit signal processing and digital signal processor TOUT performs outbound transmit signal processing.

In order to modify the EDACS® station 100 of FIG. 6 to provide systems and methods that use a single duplexed TDMA channel for SCAT control and working channels according to the present invention, the first downlink trunking processor 128a is used for control channel processing and the second and third downlink trunking processors 128b and 128c are used for working channel processing. A TDMA frame with three slots is used, with one of the slots being a SCAT control channel and the other two slots being SCAT working channels. In the first SCAT trunking processor 116a, digital signal processors RIN1 and ROUT1 are used for control channel processing and digital signal processors TIN1 and TOUT are used for control channel processing, as shown by the shading in these digital signal processing boxes. Digital signal processors RIN2, ROUT2 and TIN2 need not be used. In the second SCAT trunking processor 116b, digital signal processors RIN1, ROUT1 and TIN1 are used for working channel processing of TDMA slot 1 and digital signal processors RIN2, ROUT2 and TIN2 are used for working channel processing of TDMA slot 2. Digital signal processor TOUT is used for working channel processing for both slots 1 and slots 2. A similar arrangement is provided in the third SCAT trunking processor 116c.

It will be understood by those having skill in the art that the SCAT trunking processors 116a, 116b and 116c may be implemented using one or more digital signal processors and may be allocated to digital signal processors in other arrangements. However, FIG. 6 illustrates that existing trunked radio systems may be modified to provide SCAT systems and methods that use a single duplex TDMA channel for SCAT control and working channels according to the invention.

Figure 7:
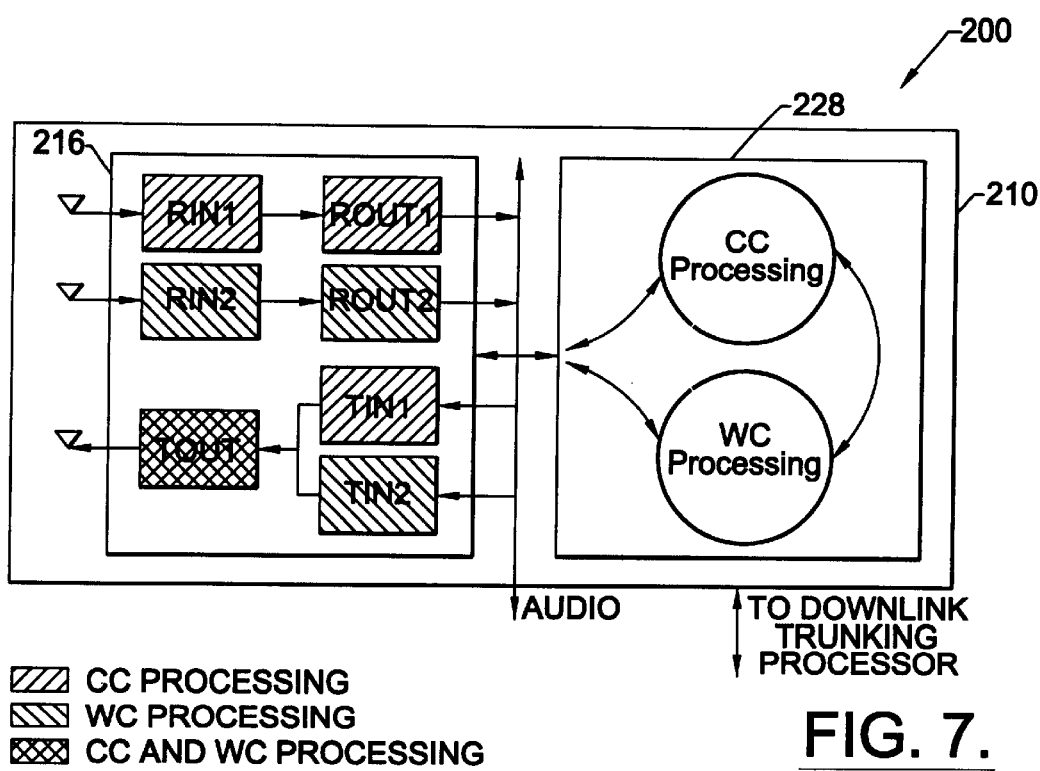
FIG. 7 illustrates a second embodiment of a trunked radio system that provides SCAT systems and methods according to the present invention.

FIG. 7 illustrates another trunked radio site that can use all the digital signal processors to provide SCAT systems and methods that use a single duplex TDMA channel for SCAT control and working channels according to the invention. As shown, a single processor 228 can provide control channel processing and working channel processing. A single SCAT trunking processor 216 including seven digital signal processors may provide a single duplex TDMA channel for SCAT control and working channels. Digital signal processors RIN1, ROUT1 and TIN1 provide control channel processing, digital signal processors RIN2 and ROUT2 and TIN2 provide working channel processing and digital processor TOUT provides control channel and working channel processing.

It will be understood that many other implementations of SCAT systems and methods may be provided using a single TDMA channel for SCAT control and working channels. Moreover, the single duplexed TDMA radio frequency channel may use other TDMA innovations to provide improved SCAT systems and methods. A standard TDMA air interface may be used.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A Single Channel Autonomous Trunking (SCAT) radio frequency repeater comprising:

a single duplex Time Division Multiple Access (TDMA) radio frequency channel including a plurality of TDMA time slots;

wherein at least a first one of the plurality of TDMA time slots is a SCAT control channel that receives working channel requests and that transmits working channel assignments; and wherein at least a second one of the plurality of TDMA time slots is a SCAT working channel that transmits and receives working channel communications in accordance with the working channel assignments;

such that the SCAT repeater simultaneously operates in a control channel mode and a working channel mode using the single duplex TDMA radio frequency channel.

2. A SCAT radio frequency repeater according to claim 1:

wherein the plurality of TDMA time slots is a first and a second TDMA time slot;

wherein the first TDMA time slot is the SCAT control channel; and wherein the second TDMA time slot is the SCAT working channel.

3. A SCAT radio frequency repeater according to claim 1:

wherein the at least a first one of the plurality of TDMA time slots is alternately a SCAT working channel that transmits and receives working channel communications in accordance with the working channel assignments.

4. A Single Channel Autonomous Trunking (SCAT) radio frequency mobile terminal comprising:

a single duplex Time Division Multiple Access (TDMA) radio frequency channel including a plurality of TDMA time slots;

wherein at least a first one of the plurality of TDMA time slots is a SCAT control channel that transmits working channel requests and that receives working channel assignments; and wherein at least a second one of the plurality of TDMA time slots is a SCAT working channel that transmits and receives working channel communications in accordance with the working channel assignments;

such that the SCAT mobile terminal simultaneously operates in a control channel mode and a working channel mode using the single duplex TDMA radio frequency channel.

5. A SCAT radio frequency mobile terminal according to claim 4:

wherein the plurality of TDMA time slots is a first and a second TDMA time slot;

wherein the first TDMA time slot is the SCAT control channel; and wherein the second TDMA time slot is the SCAT working channel.

6. A SCAT radio frequency mobile terminal according to claim 4:

wherein the at least a first one of the plurality of TDMA time slots is alternately a SCAT working channel that transmits and receives working channel communications in accordance with the working channel assignments.

7. A Single Channel Autonomous Trunking (SCAT) system comprising: at least one SCAT repeater and at least one SCAT mobile terminal; each SCAT repeater comprising:
   a single duplex Time Division Multiple Access (TDMA) radio frequency channel including a plurality of TDMA time slots;
   wherein at least a first one of the plurality of TDMA time slots is a SCAT control channel that receives working channel requests and that transmits working channel assignments; and
   wherein at least a second one of the plurality of TDMA time slots is a SCAT working channel that transmits and receives working channel communications in accordance with the working channel assignments;
   such that each SCAT repeater simultaneously operates in a control channel mode and a working channel mode using the single duplex TDMA radio frequency channel; and
each SCAT mobile terminal comprising:
   the single duplex Time Division Multiple Access (TDMA) radio frequency channel including the plurality of TDMA time slots;
   wherein the at least a first one of the plurality of TDMA time slots is the SCAT control channel that transmits working channel requests and that receives working channel assignments; and
   wherein the at least a second one of the plurality of TDMA time slots is the SCAT working channel that transmits and receives working channel communications in accordance with the working channel assignments;
   such that each SCAT mobile terminal simultaneously operates in a control channel mode and a working channel mode using the single duplex TDMA radio frequency channel.

8. A SCAT system according to claim 7:
   wherein the plurality of TDMA time slots is a first and a second TDMA time slot;
   wherein the first TDMA time slot is the SCAT control channel; and
   wherein the second TDMA time slot is the SCAT working channel.

9. A SCAT system according to claim 7:
   wherein the at least a first one of the plurality of TDMA time slots is alternately a SCAT working channel that transmits and receives working channel communications in accordance with the working channel assignments.

10. A Single Channel Autonomous Trunking (SCAT) radio frequency repeater comprising:
   means for transceiving a single duplex Time Division Multiple Access (TDMA) radio frequency channel including a plurality of TDMA time slots;
   means for receiving SCAT working channel requests and for transmitting SCAT working channel assignments in at least a first one of the plurality of TDMA time slots; and
   means for transmitting and receiving SCAT working channel communications in accordance with the working channel assignments in at least a second one of the plurality of TDMA time slots;
   such that the SCAT repeater simultaneously receives SCAT working channel requests, transmits SCAT working channel assignments and transmits and receives SCAT working channel communications using the means for transceiving a single duplex TDMA radio frequency channel.

11. A SCAT radio frequency repeater according to claim 10:
   wherein the pluraity of TDA time slots is a first and a second TDMA time slot;
   wherein the at least a first one of the plurality of TDMA time slots is a first TDMA time slot; and
   wherein the at least a second one of the plurality of TDMA time slots is a second TDMA time slot.

12. A SCAT radio frequency repeater according to claim 10:
   wherein the means for transmitting and receiving further comprises means for transmitting and receiving SCAT working channel communications in accordance with the working channel assignments in the at least a first one of the plurality of TDMA time slots.

13. A Single Channel Autonomous Trunking (SCAT) radio frequency mobile terminal comprising:
   means for transceiving a single duplex Time Division Multiple Access (TDMA) radio frequency channel including a plurality of TDMA time slots;
   means for transmitting SCAT working channel requests and for receiving SCAT working channel assignments in at least a first one of the plurality of TDMA time slots; and
   means for transmitting and receiving SCAT working channel communications in accordance with the working channel assignments in at least a second one of the plurality of TDMA time slots;
   such that the SCAT mobile terminal simultaneously transmits SCAT working channel requests, receives SCAT working channel assignments and transmits and receives SCAT working channel communications using the means for transceiving a single duplex TDMA radio frequency channel.

14. A SCAT radio frequency mobile terminal according to claim 13:
   wherein the plurality of TDMA time slots is a first and a second TDMA time slot;
   wherein the at least a first one of the plurality of TDMA time slots is a first TDMA time slot; and
   wherein the at least a second one of the plurality of TDMA time slots is a second TDMA time slot.

15. A SCAT radio frequency mobile terminal according to claim 13:
   wherein the means for transmitting and receiving further comprises means for transmitting and receiving SCAT working channel communications in accordance with the working channel assignments in the at least a first one of the plurality of TDMA time slots.

16. A Single Channel Autonomous Trunking (SCAT) system comprising:
   at least one SCAT repeater and at least one SCAT mobile terminal;
   each SCAT repeater comprising:
      first means for transceiving a single duplex Time Division Multiple Access (TDMA) radio frequency channel including a plurality of TDMA time slots;
      first means for receiving SCAT working channel requests and for transmitting SCAT working channel assignments in at least a first one of the plurality of TDMA time slots; and
      first means for transmitting and receiving SCAT working channel communications in accordance with the working channel assignments in at least a second one of the plurality of TDMA time slots;

such that each SCAT repeater simultaneously receives SCAT working channel requests, transmits SCAT working channel assignments and transmits and receives SCAT working channel communications using the first means for transceiving a single duplex TDMA radio frequency channel; and each SCAT mobile terminal comprising:

second means for transceiving a single channel duplex Time Division Multiple Access (TDMA) radio frequency channel including a plurality of TDMA time slots;

second means for transmitting SCAT working channel requests and for receiving SCAT working channel assignments in at least a first one of the plurality of TDMA time slots; and second means for transmitting and receiving SCAT working channel communications in accordance with the working channel assignments in at least a second one of the plurality of TDMA time slots;

such that each SCAT mobile terminal simultaneously transmits SCAT working channel requests, receives SCAT working channel assignments and transmits and receives working channel communications using the single duplex TDMA radio frequency channel.

17. A SCAT system according to claim 16:

wherein the plurality of TDMA time slots is a first and a second TDMA time slot;

wherein the at least a first one of the plurality of TDMA time slots is a first TDMA time slot; and wherein the at least a second one of the plurality of TDMA time slots is a second TDMA time slot.

18. A SCAT system according to claim 16:

wherein the means for transmitting and receiving further comprises means for transmitting and receiving SCAT working channel communications in accordance with the working channel assignments in the at least a first one of the plurality of TDMA time slots.

* * * * *